(12) United States Patent
Park et al.

(10) Patent No.: US 8,648,879 B2
(45) Date of Patent: Feb. 11, 2014

(54) APPARATUS AND METHOD FOR TRACKING AUGMENTED REALITY CONTENT

(75) Inventors: Jae Wan Park, Seoul (KR); Seung Gyun Kim, Seoul (KR); Gi Seok Kwon, Seoul (KR)

(73) Assignee: Maxst Co., Ltd., Seoul (KR)

( * ) Notice: Subject to any disclaimer, the term of this patent is extended or adjusted under 35 U.S.C. 154(b) by 0 days.

(21) Appl. No.: 13/396,862

(22) Filed: Feb. 15, 2012

(65) Prior Publication Data

US 2012/0249528 A1 Oct. 4, 2012

(30) Foreign Application Priority Data

Mar. 31, 2011 (KR) ........................ 10-2011-0029561

(51) Int. Cl.
*G09G 5/00* (2006.01)
*G06K 9/00* (2006.01)

(52) U.S. Cl.
USPC ............ 345/633; 345/629; 382/103; 382/107

(58) Field of Classification Search
None
See application file for complete search history.

(56) References Cited

U.S. PATENT DOCUMENTS

2010/0220891 A1* 9/2010 Lefevre et al. ............... 382/103
2012/0075285 A1* 3/2012 Oyagi et al. .................. 345/419

FOREIGN PATENT DOCUMENTS

| JP | 2006313549 A | 11/2006 |
|----|--------------|---------|
| KR | 1020090087807 A | 8/2009 |
| KR | 101010904 B1 | 9/2010 |

OTHER PUBLICATIONS

You, S. et al., Fusion of Vision and Gyro Tracking for Robust Augmented Reality Registration. Proceedings of IEEE VR2001, pp. 71-78.*
English Translation of Abstract of KR101010904.
English Translation of Abstract of KR1020090087807.

* cited by examiner

*Primary Examiner* — Maurice L McDowell, Jr.
*Assistant Examiner* — Donna J Ricks
(74) *Attorney, Agent, or Firm* — The PL Law Group, PLLC

(57) ABSTRACT

Provided are an apparatus and method for tracking augmented reality content using a mobile sensor. The method includes recognizing an augmented reality marker from an input image and calculating a position and posture of the recognized augmented reality marker, calculating a position and posture of augmented reality content corresponding to the augmented reality marker using the calculated position and posture of the augmented reality marker, synthesizing the augmented reality content with the input image using the calculated position and posture of the augmented reality content, and displaying the synthesized image, updating the position and posture of the augmented reality content using a 6-axis sensor when the augmented reality marker is not recognized in the input image; and synthesizing the augmented reality content with the input image using the updated position and posture of the augmented reality content, and displaying the synthesized image.

6 Claims, 2 Drawing Sheets

APPARATUS AND METHOD FOR TRACKING AUGMENTED REALITY CONTENT

CROSS-REFERENCE TO RELATED APPLICATION

This application claims priority from and the benefit of Korean Patent Application No. 10-2011-0029561, filed on Mar. 31, 2011, the disclosure of which is incorporated herein by reference in its entirety.

BACKGROUND

1. Field of the Invention

The present invention relates to technology for implementing an augmented reality (AR) service using a mobile device.

2. Discussion of Related Art

With the recent proliferation of smartphones, augmented reality technology is being used in various fields. An example of augmented reality technology is a technique of sensing an augmented reality marker from an image taken by a camera and synthesizing a virtual three-dimensional (3D) object according to the sensed marker with the image. Using such a technique, it is possible to make a virtual character, etc. that does not exist in reality look like it actually exists on a screen.

To display such a virtual object on a screen, it is generally necessary to recognize a marker from each frames of input images, calculate sizes, positions, shapes, etc. of the virtual object to correspond to the type and position of the recognized marker, and synthesize the virtual object with the images at the calculated position. However, when the marker goes out of frame due to the movement of the camera or a part of the marker is hidden by a nearby object, the marker cannot be correctly recognized and the virtual object corresponding to the marker, that is, augmented reality content, suddenly disappears from the screen.

SUMMARY OF THE INVENTION

An aspect of the present invention is to enable augmented reality content to be successively displayed on a screen by continuously tracking an output position and posture of the augmented reality content even if an augmented reality marker temporarily disappears from the screen while the augmented reality content is displayed using the marker.

According to an aspect of the present invention, there is provided a method of tracking augmented reality content, the method including: recognizing an augmented reality marker from an input image and calculating a position and posture of the recognized augmented reality marker; calculating a position and posture of augmented reality content corresponding to the augmented reality marker by using the calculated position and posture of the augmented reality marker; synthesizing the augmented reality content with the input image by using the calculated position and posture of the augmented reality content, and displaying the synthesized image; updating the position and posture of the augmented reality content by using a 6-axis sensor when the augmented reality marker is not recognized in the input image; and synthesizing the augmented reality content with the input image by using the updated position and posture of the augmented reality content, and displaying the synthesized image.

In the method, updating the position and posture of the augmented reality content may include: storing the position and posture of the augmented reality content calculated at a point in time when the augmented reality marker is lastly recognized in the input image, as initial values; calculating position and posture changes of the 6-axis sensor from the point in time when the augmented reality marker is lastly recognized in the input image; and updating the position and posture of the augmented reality content based on the calculated position and posture changes of the 6-axis sensor and the initial values.

In the method, the position and posture changes of the 6-axis sensor may include an amount of three-dimensional (3D) movement and an amount of 3D rotation measured by the 6-axis sensor.

According to another aspect of the present invention, there is provided an apparatus for tracking augmented reality content, the apparatus including: a marker recognizer configured to recognize an augmented reality marker from an input image; a calculator configured to calculate a position and posture of augmented reality content corresponding to the augmented reality marker by using a position and posture of the recognized augmented reality marker; an image output unit configured to synthesize the augmented reality content with the input image by using the calculated position and posture on the augmented reality content, and display the synthesized image; and a 6-axis sensor configured to measure position and posture changes of the apparatus for tracking augmented reality content, wherein the calculator updates the position and posture of the augmented reality content by using the calculated position and posture changes measured by the 6-axis sensor when the augmented reality marker is not recognized in the input image, and the image output unit synthesizes the augmented reality content with the input image by using the updated position and posture of the augmented reality content and displays the synthesized image.

In the apparatus, wherein the calculator stores position and posture of the augmented reality content calculated at a point in time when the augmented reality marker is lastly recognized in the input image as initial values, calculates position and posture changes of the 6-axis sensor since the point in time when the augmented reality marker is lastly recognized in the input image, and updates the position and posture of the augmented reality content by using the calculated position and posture changes of the 6-axis sensor and the initial values.

In the apparatus, the position and posture changes of the 6-axis sensor may include an amount of 3D movement and an amount of 3D rotation measured by the 6-axis sensor.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. However, the exemplary embodiments of the present invention described herein are merely examples, and the scope of the present invention is not limited thereto.

In the following explanations, when a detailed description of well-known functions or configurations is determined to unnecessarily cloud a gist of the present invention, the detailed description thereof will be omitted. Terminology described below is defined considering functions in the present invention and may vary according to a user's or operator's intention or usual practice. Thus, the meanings of the terminology should be interpreted based on the overall context of the present specification.

The spirit of the present invention is determined by the claims, and the following exemplary embodiments of the present invention are provided to efficiently describe the spirit of the present invention to those of ordinary skill in the art.

Figure 1:
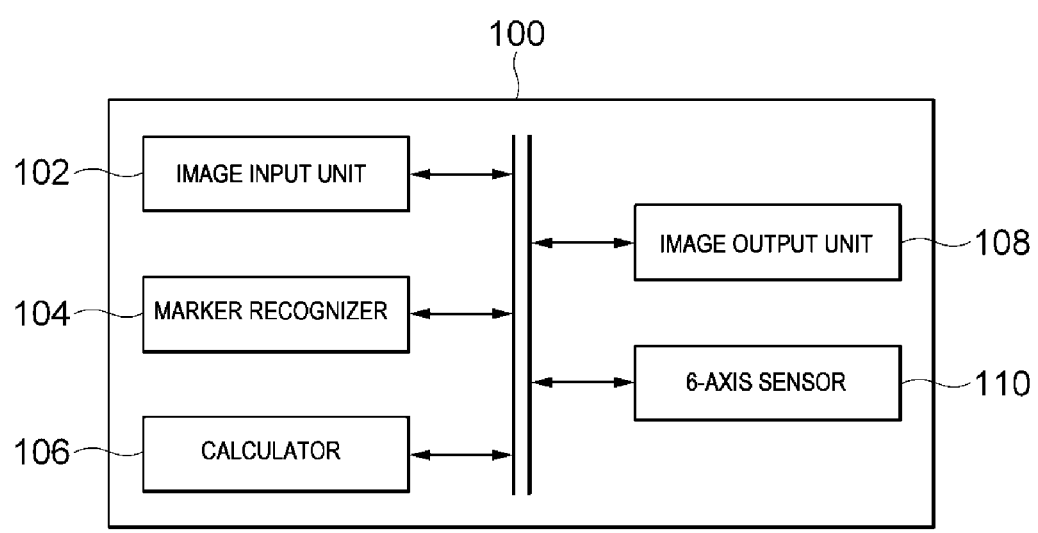
FIG. 1 is a block diagram of an apparatus for tracking augmented reality content according to an exemplary embodiment of the present invention.

FIG. 1 is a block diagram of an apparatus 100 for tracking augmented reality (AR) content according to an exemplary embodiment of the present invention.

As shown in FIG. 1, the apparatus 100 for tracking augmented reality content according to an exemplary embodiment of the present invention includes an image input unit 102, a marker recognizer 104, a calculator 106, an image output unit 108, and a 6-axis sensor 110. The apparatus 100 for tracking augmented reality content may be implemented as a mobile device, such as a digital camera, camcorder or smartphone including a camera module and a display, with which a user can take a picture while moving.

The image input unit 102 receives an image (i.e., a moving picture) taken by the camera module.

The marker recognizer 104 recognizes an augmented reality marker in the taken image received by the image input unit 102, and extracts augmented reality content corresponding to the recognized augmented reality marker.

The augmented reality marker is for identifying the type and display position of augmented reality content which will be synthesized with the image, and is configured to have a predetermined shape, pattern, etc. Examples of the marker include not only a typical marker used in a general marker-based augmented reality system, but also a target, such as a user-defined image or pattern, used to invoke an object in a markerless augmented reality system.

Augmented reality content is an object, for example, a virtual three-dimensional (3D) object, to be synthesized with the image. Because an output position and posture of the augmented reality content is determined according to a position and posture of the augmented reality marker in the image, the augmented reality content is also configured to include relative output position and posture information with respect to the output position and posture of the augmented reality marker in the image. The augmented reality content and the relative position and posture of the augmented reality content may be stored in a database, etc. in the apparatus 100 for tracking augmented reality content and extracted by the marker recognizer 104, or may be stored in an external server, etc. and transmitted via a wired/wireless network to the apparatus 100.

Since a variety of technologies relating to such an augmented reality marker, augmented reality content, marker recognition in an image, etc. have been disclosed in the art, detailed description thereof will be omitted. The present invention is not limited to a specific type of a marker, an augment reality content, or a marker recognition method, and it is possible to use any kinds of markers which can be recognized as valid identifiers on a screen.

The calculator 106 calculates a position and posture of the recognized augmented reality marker, and calculates a position and posture of the augmented reality content corresponding to the augmented reality marker using the calculated position and posture of the augmented reality marker.

Specifically, the calculator 106 calculates a position and posture of the augmented reality marker in a three dimensional (3D) space using shape (for example, when a square augmented reality marker is placed in an oblique posture from a camera, the marker looks like a trapezoid, etc. rather than a square) and size information on the augmented reality marker in the image, and calculates a position and posture of the augmented reality content in the 3D space using the calculated position and posture and a previously stored relative position and posture of the augmented reality content. When there is no specific description, a position and posture of a marker or content in a three dimensional space means a relative position and posture with respect to the apparatus 100 for tracking augmented reality content.

When the position and posture of the augmented reality content in the 3D space are calculated, the calculator 106 calculates an output position and output shape of the augmented reality content in the image using the calculated position and posture. Even the same 3D content can be shown differently according to a position of the apparatus 100 for tracking augmented reality content, and thus the calculator 106 calculates how the augmented reality content at the calculated 3D position will be actually shown on a two-dimensional (2D) screen.

The image output unit 108 synthesizes the augmented reality content with the input image according to the output position and output shape calculated by the calculator 106, and displays the synthesized image.

Recognition of an augmented reality marker, calculation of a position of augmented reality content, and image synthesis using the marker recognizer 104, the calculator 106 and the image output unit 108 described above are performed on each frame of the input image in real time. Thus, a user viewing an image output from the image output unit 108 feels like the augmented reality content actually exists in the image.

Next, the 6-axis sensor 110 measures changes in position and posture of the apparatus 100 for tracking augmented reality content. The 6-axis sensor 110 includes a sensor such as an accelerometer and gyroscope included in a mobile terminal, but not limited thereto, and is configured to sense 3D positional movement and 3D rotation of the apparatus 100 for tracking augmented reality content. In other words, when the apparatus 100 for tracking augmented reality content moves to another position in a 3D space or changes its posture, the movement or change in posture is sensed by the 6-axis sensor 110.

When an augmented reality marker on a screen is recognized and the screen is overlaid with augmented reality content corresponding to the marker and displayed through the above-described process, the augmented reality content may need to be continuously displayed on the screen even if the augmented reality marker is not recognized on the screen. For example, assume that an augmented reality marker is placed on the ground, and augmented reality content corresponding to the marker is an animal taller than a human, such as a dinosaur. In this case, when a user takes a picture of the augmented reality marker put on the ground with a camera of the apparatus 100 directed downward, the apparatus 100 for tracking augmented reality content recognizes the augmented reality marker and outputs the content (dinosaur) corresponding to the marker on the screen. At this time, if the apparatus 100 for tracking augmented reality content is close to the marker, a photographed area is smaller than a size of the content (a dinosaur), and thus only a lower part of the dinosaur is displayed on the screen.

When the user gradually moves the camera of the apparatus 100 upward in this situation, an upper part of the dinosaur needs to be displayed on the screen with the movement of the camera. However, when the augmented reality marker goes out of the image due to the movement of the camera, the marker recognizer 104 cannot recognize the augmented reality marker anymore, and the dinosaur suddenly disappears from the screen.

To solve this problem, when the augmented reality marker is not recognized in the input image, a position and posture of the augmented reality content are updated using the 6-axis sensor 110, and the image output unit 108 synthesizes the augmented reality content with the input image using the updated position and posture of the augmented reality content and outputs the synthesized image.

A specific method of displaying augmented reality content when an augmented reality marker disappears from an input image due to movement of the apparatus 100 or hiding of the marker caused by another object, etc. will be described below.

First, when an augmented reality marker is no longer recognized in an image input from the image input unit 102, the calculator 106 stores, as initial values, position and posture of the corresponding augmented reality content calculated at a point when the augmented reality marker disappears from the image, that is, the augmented reality marker is lastly recognized in the input image.

Also, the calculator 106 stores, as reference values, position and posture of the 6-axis sensor 110 calculated at the point in time when the augmented reality marker disappears from the image.

Subsequently, position and posture information measured by the 6-axis sensor 110 as the apparatus 100 moves in a 3D space is compared with the reference values to calculate position and posture changes of the apparatus 100 in the 3D space, and the calculated changes are added to the initial values to update the position and posture of the augmented reality content. Here, the position and posture changes of the 6-axis sensor 110 denote an amount of 3D movement and an amount of 3D rotation measured by the 6-axis sensor 110.

When the updated position and posture of the augmented reality content is calculated in this way, the image output unit 108 synthesizes the augmented reality content with the input image using the calculated information and outputs the synthesized image.

Meanwhile, when the augmented reality marker is recognized again in a screen, the apparatus 100 for tracking augmented reality content estimates a position and posture of the augmented reality content from the augmented reality marker recognized as described above, and displays the augmented reality content.

If a position of augmented reality content is updated using a 6-axis sensor using above-mentioned method, the augmented reality content does not disappear and is continuously displayed even when the corresponding augmented reality marker is not shown in a screen. Thus, it is possible to make better use of the augmented reality marker and content. In other words, huge-sized augmented reality content that is difficult to display on a screen as described above can also be displayed.

Also, in an exemplary embodiment of the present invention, a position and posture are calculated in real time using an augmented reality marker when the augmented reality marker is on a screen, and 6-axis sensor information is only used in a section in which the marker disappears from the screen. Thus, an output error of augmented reality content can be minimized. In other words, errors of a position and posture calculated by a 6-axis sensor accumulate over time, but in an exemplary embodiment of the present invention, however, the use of the 6-axis sensor is minimized since 6-axis sensor information is only used in a section in which a marker disappears from a screen, and therefore accumulation of an error can also be minimized.

Figure 2:
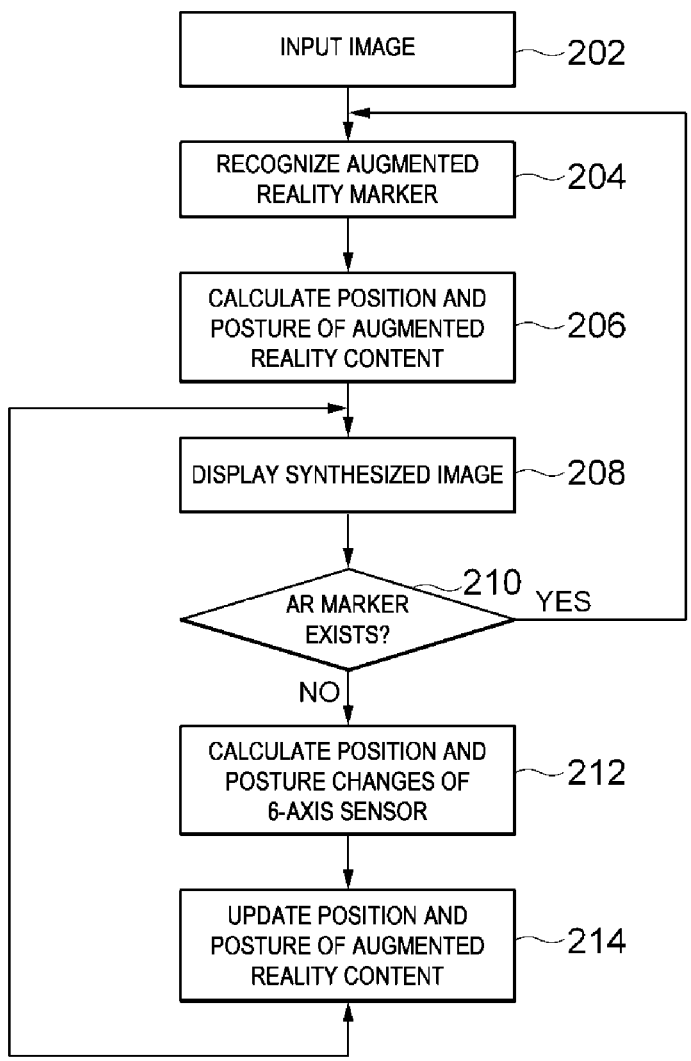
FIG. 2 is a flowchart illustrating a method of tracking augmented reality content according to an exemplary embodiment of the present invention.

FIG. 2 is a flowchart 200 illustrating a method of tracking augmented reality content in an apparatus for tracking augmented reality content according to an exemplary embodiment of the present invention.

First, when an image (a motion picture) is input from the image input unit 102 (202), the marker recognizer 104 recognizes an augmented reality marker in the input image (204). A position and posture of the recognized augmented reality marker are calculated, and a position and posture of augmented reality content corresponding to the augmented reality marker are calculated using the calculated position and posture of the augmented reality marker (206).

Next, the augmented reality content is synthesized with the input image using the calculated position and posture of the augmented reality content, and the synthesized image is displayed (208).

Next, the marker recognizer 104 determines whether an augmented reality marker is recognized in the input image (210). When an augmented reality marker is recognized in the input image, steps 204 to 208 are performed again.

On the other hand, when there is no augmented reality marker in the input image, the calculator 106 updates the position and posture of the augmented reality content using an amount of positional movement and an amount of postural movement of the 6-axis sensor 110 measured by the 6-axis sensor 110 (212 and 214). Then, the augmented reality content is synthesized with the input image using the updated position and posture of the augmented reality content, and the synthesized image is displayed (208). A detailed method of updating the position and posture of the augmented reality content using the 6-axis sensor 110 is the same as described in FIG. 1.

According to the exemplary embodiments of the present invention, it is possible to continuously track an output position and posture of augmented reality content even when an augmented reality marker temporarily disappears from a screen, thereby it enables to control the augmented reality content to be continuously displayed on the screen.

Also, because the present invention tracks the position of augmented reality content using sensing results of a 6-axis sensor only in a situation when an augmented reality marker is temporarily not shown on a screen, it is possible to minimize an error of the position of the augmented reality content resulting from an error of the 6-axis sensor.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of tracking augmented reality content, comprising:
    recognizing an augmented reality marker from an input image and calculating a position and posture of the recognized augmented reality marker;
    calculating a position and posture of augmented reality content corresponding to the augmented reality marker by using the calculated position and posture of the augmented reality marker;

synthesizing the augmented reality content with the input image by using the calculated position and posture of the augmented reality content, and displaying the synthesized image;
updating the position and posture of the augmented reality content by using a 6-axis sensor when the augmented reality marker is not recognized in the input image; and
synthesizing the augmented reality content with the input image by using the updated position and posture of the augmented reality content, and displaying the synthesized image;
wherein, when a size of the input image to be synthesized with the augmented reality content is smaller than a size of the augmented reality content, and when the augmented reality marker is not recognized in the input image, only a part of the augmented reality content is synthesized with the input image by:
storing, as initial values, the position and posture of said part of the augmented reality content calculated at a point in time when the augmented reality marker is lastly recognized in the input image;
calculating the position and posture changes of the 6-axis sensor from the point in time when the augmented reality marker is lastly recognized in the input image; and
updating the position and posture of said part of the augmented reality content based on the initial values and the calculated position and posture changes of the 6-axis sensor.

2. The method of claim 1, wherein the position and posture changes of the 6-axis sensor include an amount of three-dimensional (3D) movement and an amount of 3D rotation measured by the 6-axis sensor.

3. The method of claim 1, wherein the position and posture of the augmented reality content is updated by using the 6-axis sensor only when the augmented reality marker is not recognized in the input image.

4. An apparatus for tracking augmented reality content, comprising:
a marker recognizer configured to recognize an augmented reality marker from an input image;
a calculator configured to calculate a position and posture of augmented reality content corresponding to the augmented reality marker using a position and posture of the recognized augmented reality marker;
an image output unit configured to synthesize the augmented reality content with the input image by using the calculated position and posture on the augmented reality content, and display the synthesized image; and
a 6-axis sensor configured to measure position and posture changes of the apparatus for tracking the augmented reality content,
wherein the calculator updates the position and posture of the augmented reality content by using the calculated position and posture changes measured by the 6-axis sensor when the augmented reality marker is not recognized in the input image, and
the image output unit synthesizes the augmented reality content with the input image by using the updated position and posture of the augmented reality content and displays the synthesized image;
wherein, when a size of the input image is smaller than a size of the augmented reality content, and when the augmented reality marker is not recognized in the input image,
the calculator stores position and posture of only a part of the augmented reality content calculated at a point in time when the augmented reality marker is lastly recognized in the input image as initial values, calculates position and posture changes of the 6-axis sensor since the point in time when the augmented reality marker is lastly recognized in the input image, and updates the position and posture of said part of the augmented reality content using the calculated position and posture changes of the 6-axis sensor and the initial values, and
the image output unit synthesizes only said part of the augmented reality content with the input image by using the updated position and posture.

5. The apparatus of claim 4, wherein the position and posture changes of the 6-axis sensor include an amount of three-dimensional (3D) movement and an amount of 3D rotation measured by the 6-axis sensor.

6. The apparatus of claim 4, wherein the 6-axis sensor is configured to update the position and posture of the augmented reality content only when the augmented reality marker is not recognized in the input image.

* * * * *